Figure 1:
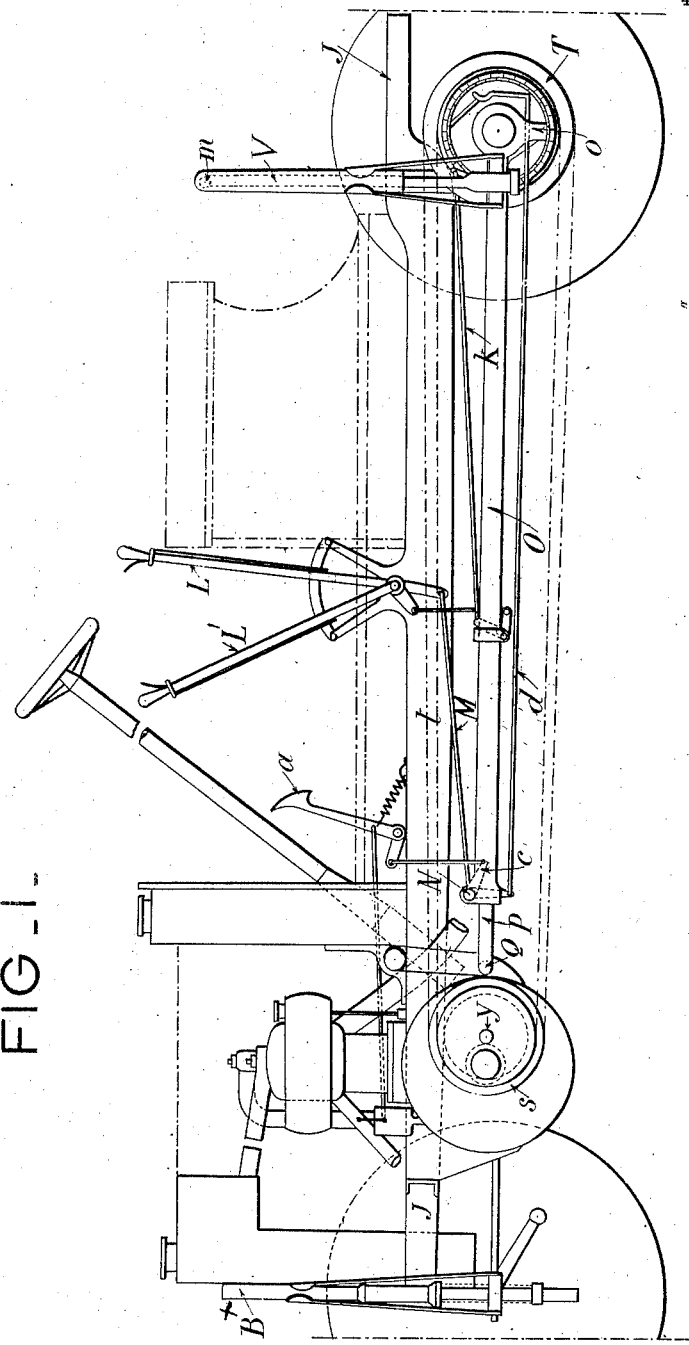

No. 868,728. PATENTED OCT. 22, 1907.
J. M. M. TRUFFAULT.
AUTOMOBILE VEHICLE.
APPLICATION FILED APR. 29, 1907.

4 SHEETS—SHEET 1.

WITNESSES
W. P. Burk
A. F. Heuman

INVENTOR
Jules Michel Marie Truffault
BY
ATTY.

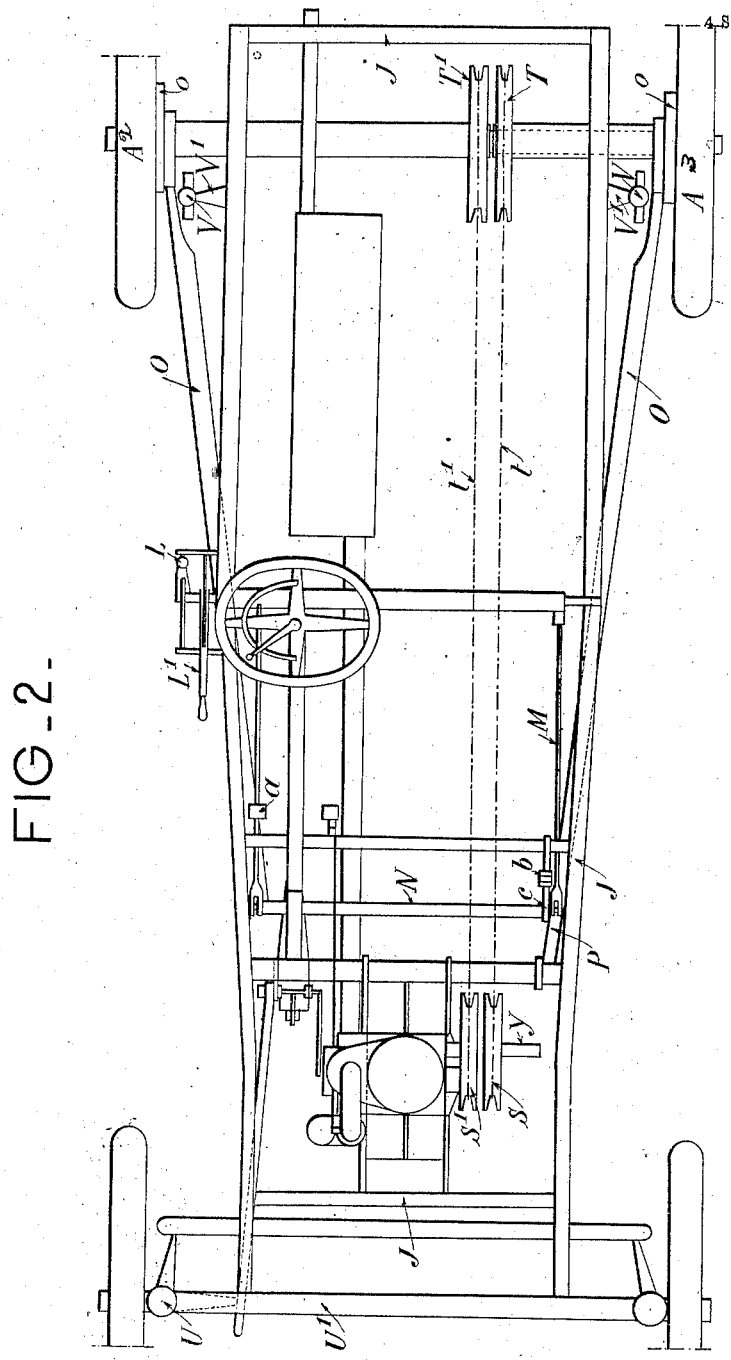

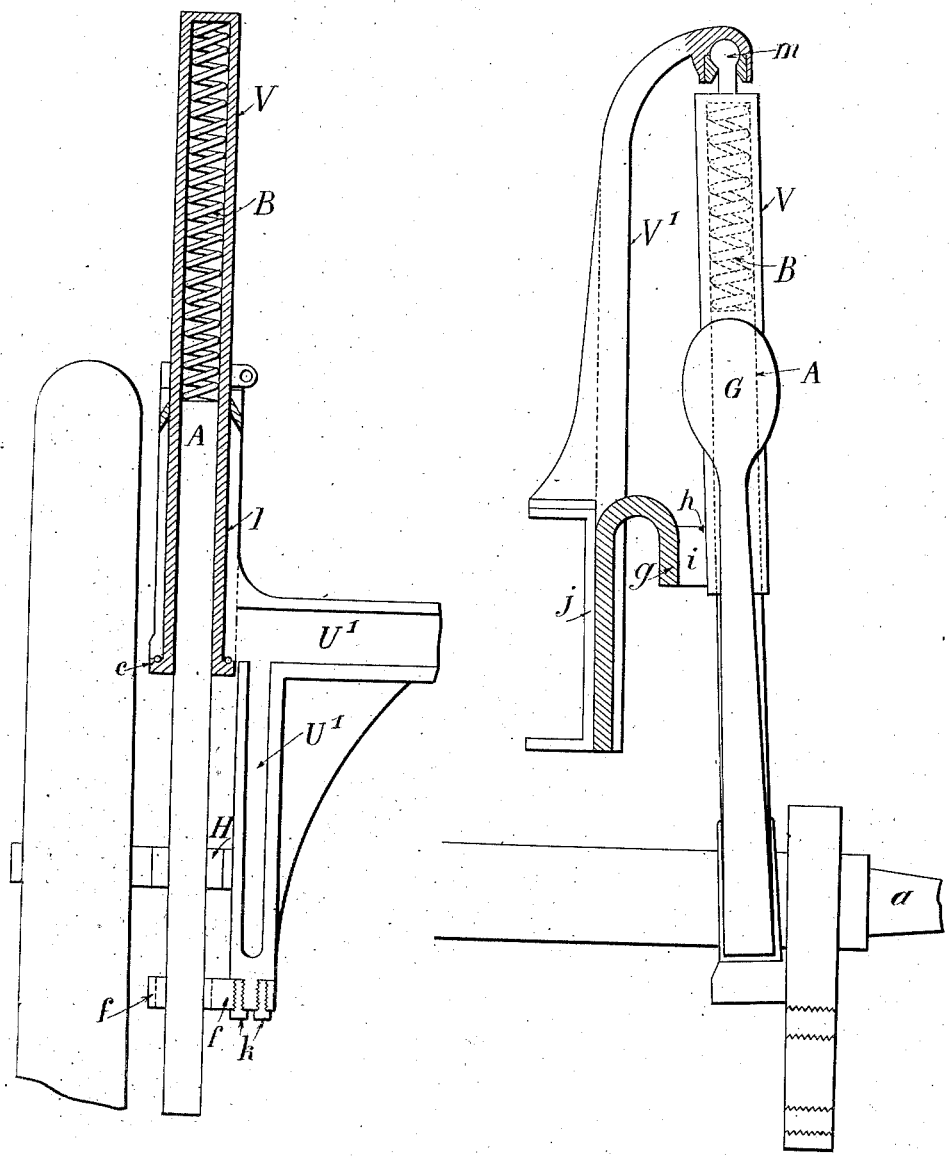

No. 868,728.
PATENTED OCT. 22, 1907.
J. M. M. TRUFFAULT.
AUTOMOBILE VEHICLE.
APPLICATION FILED APR. 29, 1907.
4 SHEETS—SHEET 4.
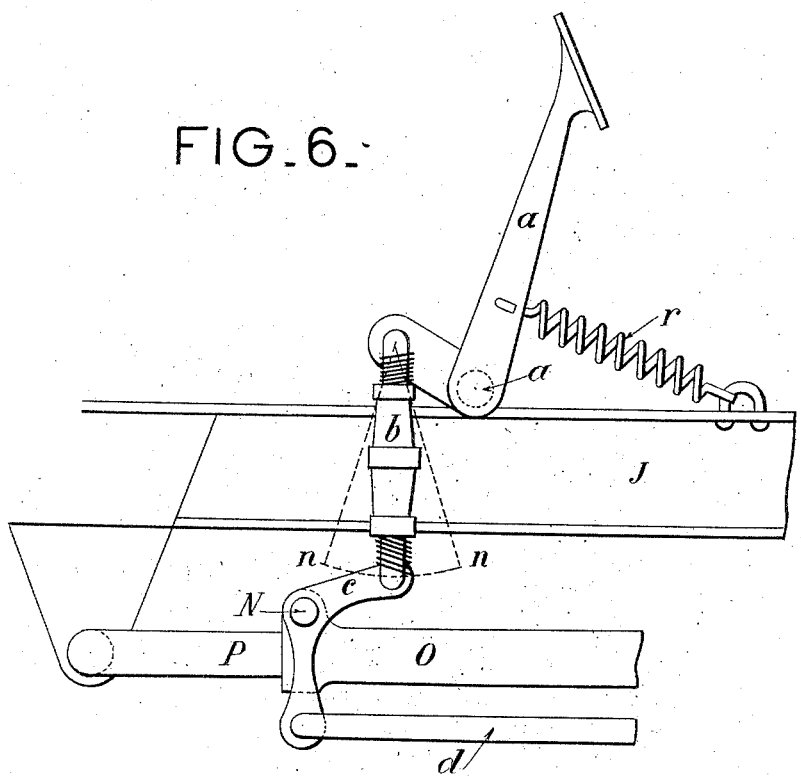
FIG. 6.
FIG. 5.
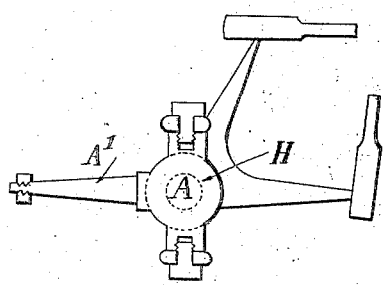
WITNESSES
W. P. Burk
A. F. Heuman
INVENTOR
Jules Michel Marie Truffault

UNITED STATES PATENT OFFICE.

JULES MICHEL MARIE TRUFFAULT, OF PARIS, FRANCE, ASSIGNOR TO SOCIÉTÉ DES AUTOMOBILES TRUFFAULT, OF PARIS, FRANCE.

AUTOMOBILE VEHICLE.

No. 868,728.      Specification of Letters Patent.      Patented Oct. 22, 1907.

Application filed April 29, 1907. Serial No. 370,857.

*To all whom it may concern:*

Be it known that I, JULES MICHEL MARIE TRUFFAULT, civil engineer, a citizen of France, residing at 51 Avenue des Ternes, Paris, France, have invented new and useful Improvements in Automobile Vehicles, of which the following is a specification.

This invention has for its object an automobile vehicle of great mechanical simplicity, characterized by the combination of arrangements in close dependence on one another which insure perfect running of the vehicle and renders its control very simple.

The transmission between the shaft given by the engine and the driving wheels of the vehicle is accomplished by means of an arrangement of pulleys and belts consisting of two pulleys and a belt by the driving wheel and forming at the same time the differential and transmission. This arrangement allows of omitting the usual differential gear, while insuring the same advantages and simplifies the construction to a substantial degree. The employment of this first arrangement allows of clutching, unclutching and changes in the forward speed by simply displacing the rear axle or the axle of the driving wheels in relation to the shaft driven by the engine which is solid with the chassis thus doing away with change speed gear boxes the disadvantages of which are well known. The employment of this last arrangement necessitates the provision between the chassis and the rear wheels of a suspension arrangement the operation of which will be independent of the position of the axle. This has been obtained by the application of a vertical suspension by a piston and helical spring connected by a ball and socket to the chassis and completed preferably by an exterior friction deadening member.

The employment of the universal suspension necessitates the application of an abutment capable of preventing the lateral displacements of the chassis in relation to the wheels under the action of vibration and of centrifugal force; in taking curves these efforts tend in effect to displace the chassis laterally in relation to the wheels which would cause serious disadvantages. Finally the means for controlling the brakes which act on the rear axle permit of actuating these brakes whatever may be the position of the said rear axle in relation to the chassis with the same security as would be the case were the rear axle not displaced in relation to the chassis.

The annexed drawings show one embodiment of an automobile according to the invention.

Figure 1 is a side elevation some parts of the structure being omitted. Fig. 2 is a plan. Fig. 3 is an elevation of the rear suspension and of the arrangement preventing lateral displacements of the chassis. Fig. 4 is an elevation of the front suspension. Fig. 5 shows in detail the support of a front wheel. Fig. 6 shows in detail the means for actuating the brake.

Referring to Fig. 1, it will be seen that the differential transmission system employed between the engine and the rear wheels is composed and is comprised as follows: The motor $B^X$ directly or through reducing gear rotates the shaft $y$ on which are keyed pulleys S and S′ of equal diameter having trapezoidal grooves, which actuate respectively pulleys of larger diameter T and T′ through the intermediary of belts $t$ and $t'$. Each of the rear wheels $A^2$ and $A^3$ of the vehicle are keyed on an axle section, these two sections telescoping and turning independently of one another are each rotated by one of the pulleys S and S′. With these conditions if the vehicle travels in a straight line the two driving wheels $A^2$ and $A^3$ have the same resistance to overcome and the two pulleys S and S′ transmit equal power with equal speed by the belts $t$ $t'$ and pulleys T T′ respectively. But should the vehicle take a curve the inside wheel must turn slower than the outside wheel, the two pulleys S S′ maintain their speed, determined by that of the motor, but by reason of the said transmission system a slip occurs between the belt and the pulley S or S′ according as the pulley T or T′ and its corresponding wheel does not turn at the requisite speed or even remains stationary, which prevents sliding of the wheel on the road. This arrangement thus insures the effect of an ordinary differential without necessitating the employment of any gearing. Figs. 1 and 2 also show the means of moving the rear wheels in relation to the chassis which means allow of changing speeds. To each side of the chassis is articulated at Q a rod P which is inclosed in a tube O articulated at $o$ to the hub of the rear wheel on the same side. The different parts serving to operate and control this device are indicated in the drawing by the letters N M and L. On actuating the lever L the rod M is displaced which in its turn causes the tube O to slide on the rod P. The arrangement of tubes O and rear wheels is thus displaced in relation to the chassis. By this means the two systems of pulleys may be brought towards one another so as to cause the belts to be loose to such a degree as not to turn the pulleys. This constitutes the unclutching; these pulleys may also be gradually moved further apart; there comes a moment when the belts communicate to them a slight movement of rotation accompanied by slip of the said belts on the small pulleys. This constitutes the clutching, then as this movement increases the slip diminishes and the speed of rotation increases until it passes through all the intermediary values to normal speed.

It will be observed that instead of making the rear axle of two telescoping parts, there may be employed a fixed axle with wheels arranged loose on the journals the pulleys T and T′ being keyed on these wheels.

To allow the free displacement of the rear motor axle as above stated there are employed the following means for the rear suspension, which is shown in detail in Fig. 3. A tube V, in which is or are fitted one or more helical springs B carries at its upper part the male part of a ball and socket joint $m$. The female part of this ball and socket is solid with a rod V′ fixedly connected to the chassis J. A vertical rod A, solid with the rear axle enters the tube V and compresses more or less the spring B according to the vibrations which are produced. This construction then permits displacements of the rear axle and constitutes at the same time an elastic suspension. This suspension is completed by the addition of metal plates G solid with the rear axle these plates sliding with more or less frictions on the outside surface of the tube V, decreasing the rapidity of the upward movement which results from the distention of the spring B after its compression; these constitute a buffer. The front wheels are provided with similar suspension but the ball and socket which would here be useless is dispensed with. Fig. 4 shows this suspension. There is no axle properly speaking; the cross bar U′ which takes its place carries at each of its ends a sleeve $l$. The bar A is solid with the steering plate H (Fig. 5) cast integral with A′. This arrangement is completed by the addition of a buffer member similar to that mounted on the rear wheels. Further to obviate all accidents this rod A is guided by the collar $f$ mounted by the part $k$ on a heel cast integral with the cross bar U′. This collar forms an abutment which prevents the distention of the springs.

To suppress lateral movements of the chassis which are easily caused when taking curves, under the action of centrifugal force, when there has been provided the rear ball and socket suspension of the chassis there is employed in the vehicle an arrangement which does not prevent relative displacements of the chassis and the rear axle in a longitudinal direction but prevents all lateral displacements. This arrangement is shown in Fig. 3.

A counter plate $g$ fixed on the chassis J and supported at $h$ on the tube V, constantly maintains the distance of the chassis from the wheels. A piece of leather $i$ insures soft and silent rubbing. This counter plate may be mounted inversely that is to say solid with the axle with its support on the chassis.

The displacements of the rear axle necessitates a special arrangement for controlling the brakes. This detail is shown applied to a foot brake in Fig. 6. It has been seen that the rod P is articulated at Q to the chassis J and that the tube O controls the movements of the rear axle. For a given position of the rear axle the action on the pedal $a$ transmitted by the parts $a$, $b$, $c$ acts through the rod $d$ on the brake. If the rear axle is displaced the tube O transmits the movement to the bell-crank $c$, and the rod $d$ which simply produces a slight inclination of the adjustable rod $b$ which inclination does not prevent in any degree the operation of the brakes as is indicated by the dotted lines $n$ (Fig. 6). Whatever may be the position of the rear axle, the spring $r$ always restores the brake to its neutral position. The operation of the hand brake is exactly the same. It should be observed that this kind of transmission permits of braking without previously unclutching. Thus what would be in an ordinary vehicle a great disadvantage only causes the belts to slip on the small pulleys. The four brakes are shown diagrammatically in Figs. 1 and 2. The two brakes having an external action outside are controlled by a lever and toothed sector while the two brakes having an internal action are controlled by a pedal.

Having now described my invention, what I claim as new and desire to secure by Letters Patent is:

1. An automobile vehicle comprising in combination two small grooved pulleys S S′ keyed on the driven shaft, two large grooved pulleys T T′ solid with the driving wheels and independent of one another, two belts $t$ $t'$ connecting each a small pulley to the large pulley situated on the same side, lateral sliding members O connected by one of their ends to the rear train which carries the two large pulleys solid with the wheels, lateral rods P pivoted on a fixed part of the chassis and inclosed in the lateral members O, operating rods M connected by one end to the lateral members, an operating lever L connected to the operating rods M, a vertical ball and socket suspension A, B, V, $m$, V′ situated between the chassis and the rear train, and a friction abutment $g$ $i$ inserted at each side between the chassis and the rear suspension, substantially as described and for the purpose set forth.

2. An automobile vehicle comprising in combination two small grooved pulleys S S′ keyed on the driven shaft, two large grooved pulleys T T′ solid with the driving wheels and independent of one another, two belts $t$ $t'$ connecting each a small pulley to the large pulley situated on the same side, lateral sliding members O connected by one of their ends to the rear train which carries the two large pulleys solid with the wheels, lateral rods P pivoted on a fixed part of the chassis and inclosed in the lateral members O, operating rods M connected by one end to the lateral members, an operating lever L connected to the operating rods M, a vertical ball and socket suspension A, B, V, $m$, V′, situated between the chassis and the rear train, a friction abutment $g$ $i$ inserted at each side between the chassis and the rear suspension, a brake angle-lever $e$ pivoted on the sliding member O, a brake rod $d$ pivoted to one of the arms of the angle-lever, an adjustable connecting rod $b$ pivoted to the second arm of the angle-lever, and a pedal or hand lever adapted to actuate the connecting rod $b$, substantially as described and for the purpose set forth.

In testimony whereof I have signed my name to this specification in the presence of two subscribing witnesses.

JULES MICHEL MARIE TRUFFAULT.

Witnesses:
ANTOINE LAVOIX,
RENÉ GRAVEREAUX.